(12) United States Patent
Smulders et al.

(10) Patent No.: US 7,272,082 B2
(45) Date of Patent: Sep. 18, 2007

(54) OPTICAL SCANNING DEVICE COMPRISING A TILTABLE LENS SYSTEM

(75) Inventors: Patrick Johannes Cornelus Hendrik Smulders, Eindhoven (NL); Jan Willem Aarts, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1057 days.

(21) Appl. No.: 10/144,826

(22) Filed: Oct. 25, 2001

(65) Prior Publication Data

US 2002/0136145 A1    Sep. 26, 2002

(30) Foreign Application Priority Data

Nov. 1, 2000    (EP) .................................. 00203806

(51) Int. Cl.
*G11B 7/00* (2006.01)

(52) U.S. Cl. .................................. 369/44.14; 369/44.15

(58) Field of Classification Search ............. 369/44.23, 369/112.24, 44.15, 44.14, 44.16, 44.32, 44.22, 369/53.28, 112.23; 359/813, 814, 823, 824
See application file for complete search history.

(56) References Cited

U.S. PATENT DOCUMENTS

| | | | | |
|---|---|---|---|---|
| 5,165,088 A | * | 11/1992 | Suzuki et al. ............. | 369/44.14 |
| 5,301,175 A | | 4/1994 | Nakamura ................ | 369/44.32 |
| 5,579,295 A | * | 11/1996 | Van Rosmalen ............ | 720/683 |

* cited by examiner

*Primary Examiner*—Paul W. Huber
(74) *Attorney, Agent, or Firm*—Michael E. Belk

(57) ABSTRACT

An optical scanning device includes an actuator for displacing an objective lens in a first direction parallel to the optical axis of the objective lens, and in a second direction parallel to a radial direction. The actuator includes at least two electrical coils having wire portions directed parallel to the first direction for generating Lorentz forces in the second direction. Points of application of the Lorentz forces on first and second coils of the two coils are in different positions with respect to each other, viewed in a direction parallel to the first direction.

7 Claims, 4 Drawing Sheets

OPTICAL SCANNING DEVICE COMPRISING A TILTABLE LENS SYSTEM

Figure 1:
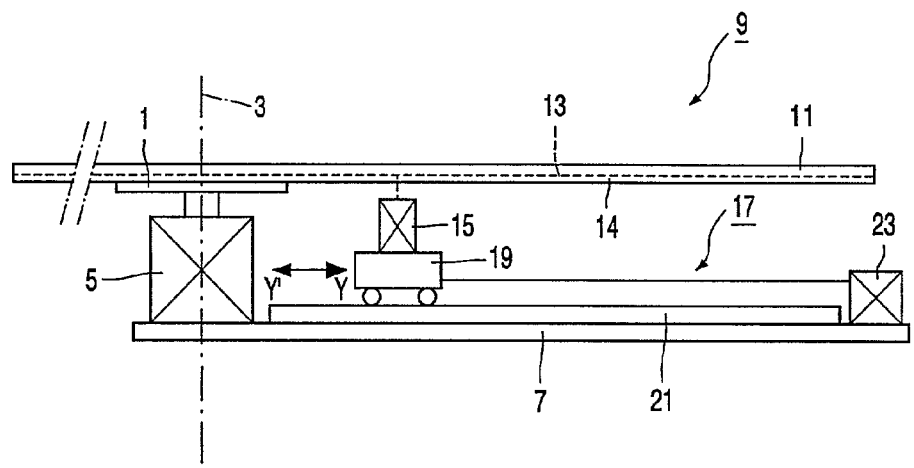

The invention relates to an optical scanning device for scanning an information layer of an optically scannable information carrier, which scanning device is provided with a radiation source, an optical lens system with an optical axis for focusing a radiation beam supplied, in operation, by the radiation source to a scanning spot on the information layer, and an actuator comprising an electric coil system and a magnetic system by means of which the lens system can be displaced, with respect to a stationary part of the scanning device, in a first direction parallel to the optical axis and in a second direction perpendicular to the first direction, the coil system being provided, for generating a force directed parallel to the second direction, with at least one first and one second electric coil including wire portions directed parallel to the first direction.

The invention further relates to an optical player comprising an optical scanning device for scanning an information layer of an optically scannable information carrier, said scanning device being provided with a radiation source, an optical lens system with an optical axis for focusing a radiation beam supplied, in operation, by the radiation source to a scanning spot on the information layer, and an actuator comprising an electric coil system and a magnetic system by means of which the lens system can be displaced with respect to a stationary part of the scanning device in a first direction parallel to the optical axis and in a second direction perpendicular to the first direction, the coil system being provided, for generating a force directed parallel to the second direction, with at least one first and one second electric coil having wire portions directed parallel to the first direction, said optical player further being provided with a table on which the information carrier can be placed, and which can be rotated about an axis of rotation, and with a displacement device by means of which at least the lens system of the scanning device can be displaced with respect to the axis of rotation predominantly in a radial direction.

An optical scanning device and an optical player of the types mentioned in the opening paragraphs are disclosed in U.S. Pat. No. 5,301,175. The known optical player and the known optical scanning device employed therein can suitably be used for reading, for example, a CD or DVD. As the lens system of the scanning device can be displaced by means of the actuator in said first direction, i.e. parallel to the optical axis, a distance present between the lens system and the information layer can be kept as constant as possible and the radiation beam can be focused on the information layer in the best possible way. As the lens system can be displaced by means of the actuator in said second direction, i.e. in a radial direction at right angles to the optical axis, the scanning spot of the radiation beam can be maintained on an information track present on the information layer in the best possible way. The actuator also enables the lens system of the known scanning device to be tilted through small angles about a first tilt axis directed parallel to the second direction, and about a second tilt axis extending parallel to a third direction directed perpendicularly to the first direction and perpendicularly to the second direction. By virtue thereof, the radiation beam can be directed at the information layer in the best possible way. This is necessary because the orientation of the information layer with respect to the stationary part of the scanning device may vary, in operation, as a result of an oblique position or warpage of the information carrier. To make it possible for the lens system to tilt about said tilt axes, the coil system of the actuator of the known scanning device comprises, in addition to the two electric coils for generating the force that is directed parallel to the second direction, two coil pairs which, viewed in a direction parallel to the third direction, are arranged on either side of the lens system and the first tilt axis. The two electric coils of each coil pair are arranged on either side of the second tilt axis and provided with wire portions, directed parallel to the second direction, for generating a force that is directed parallel to the first direction. The four electric coils are individually controlled by a control unit of the scanning device, so that, by means of the four coils, a force can be generated, directed parallel to the first direction, for displacing the lens system in a direction parallel to the optical axis, a mechanical torque directed about the first tilt axis can be generated for tilting the lens system about the first tilt axis, and a mechanical torque directed about the second tilt axis can be generated for tilting the lens system about the second tilt axis.

As the known scanning device comprises four electric coils for generating a force directed parallel to the first direction, the structure of the known scanning device is complex. Known scanning devices, the lens system of which cannot be tilted, customarily comprise only a single focusing coil, the wire portions of which are wound around the lens system. Like the scanning device disclosed in U.S. Pat. No. 5,301,175, such scanning devices customarily comprise two coils for generating the force directed parallel to the second direction.

It is an object of the invention to provide an optical scanning device and an optical player of the types mentioned in the opening paragraphs, the lens system of which can also be appropriately tilted by means of the actuator, but the coil system of the actuator comprises a smaller number of electric coils.

To achieve this object, an optical scanning device is characterized in accordance with the invention in that a point of application of a force on said wire portions of the first coil, which force is directed parallel to the second direction, and a point of application of a force on said wire portions of the second coil, which force is directed parallel to the second direction, are situated, in operation, in different positions with respect to each other, viewed in a direction parallel to the first direction.

To achieve this object, an optical player in accordance with the invention is characterized in that the optical scanning device employed therein is an optical scanning device in accordance with the invention.

As the points of application of the forces, directed parallel to the second direction, on the first coil and the second coil are situated in different positions with respect to each other, viewed in a direction parallel to the first direction, not only a force, directed parallel to the second direction, for displacing the lens system in a direction parallel to the second direction is generated by means of the first coil and the second coil, but also a mechanical torque about a tilt axis can be generated by means of the first coil and the second coil, which tilt axis extends parallel to a third direction directed perpendicularly to the first direction and perpendicularly to the second direction. By separately controlling the electric currents in both coils, the displacement of the lens system in a direction parallel to the second direction, and tilting of the lens system about said tilt axis can be independently controlled. It has been found that the possibility of tilting the lens system about only said tilt axis directed parallel to the third direction is generally sufficient to appropriately compensate for an oblique position or warpage of the information carrier by means of a tilt of the lens system. Apart from said first and said second coil, the scanning device only has to comprise a further coil having wire portions directed perpendicularly to the first direction to generate a force directed parallel to the optical axis, consequently, the number of coils of the coil system of the scanning device in accordance with the invention, which are necessary to make sure that the lens system is sufficiently tiltable, is comparatively small.

A particular embodiment of an optical scanning device in accordance with the invention is characterized in that said point of application on the first coil and said point of application on the second coil are situated, viewed in a direction parallel to the first direction, on either side of and substantially equidistantly from a center of gravity of a mass formed by the lens system and a movable part of the actuator. In this particular embodiment, a displacement of the lens system in a direction parallel to the second direction is achieved by means of two equally large and equally directed currents in the first and the second coil, and a tilt of the lens system about said tilt axis is achieved by means of two equally large, opposed currents in the first and the second coil. In this manner, the control of the currents in the two coils is simplified.

A further embodiment of an optical scanning device in accordance with the invention is characterized in that said wire portions of the first and the second coil are entirely situated, in operation, in a magnetic field of the magnetic system, a center of the first coil and a center of the second coil being situated, viewed in a direction parallel to the first direction, in different positions with respect to each other. As the wire portions are entirely situated in the magnetic field of the magnetic system, said wire portions are fully used to generate the force that is directed parallel to the second direction, as a result of which the actuator has a high efficiency. As the centers of the two coils, viewed in a direction parallel to the first direction, are situated in different positions with respect to each other, it is achieved in a simple manner that the points of application, of the forces directed parallel to the second direction, on the two coils are situated in different positions with respect to each other, viewed in a direction parallel to the first direction.

Yet another embodiment of an optical scanning device in accordance with the invention is characterized in that the center of the first coil and the center of the second coil, viewed in a direction parallel to the first direction, are situated on either side of and substantially equidistantly from a center of gravity of a mass formed by the lens system and a movable part of the actuator. In this embodiment, a displacement of the lens system in a direction parallel to the second direction is achieved by means of two equally large currents of equal sense in the first and the second coil, and a tilt of the lens system about said tilt axis is achieved by means of two equally large, opposite currents in the first and the second coil. In this manner, the control of the currents in the two coils is simplified.

A particular embodiment of an optical scanning device in accordance with the invention is characterized in that the coil system for generating the force that is directed parallel to the second direction is provided with two coil pairs which, viewed in a direction parallel to a third direction directed perpendicularly to the first direction and perpendicularly to the second direction, are situated on either side of and substantially equidistantly from said center of gravity, the centers of the two coils of each coil pair, viewed in a direction parallel to the first direction, being situated on either side of and substantially equidistantly from the center of gravity. As the two coil pairs are situated on either side of and substantially equidistantly from the center of gravity, viewed in a direction parallel to the third direction, it is precluded that, apart from the desired torque about said tilt axis, the coils also generate an undesirable torque about the optical axis.

Figure 2:
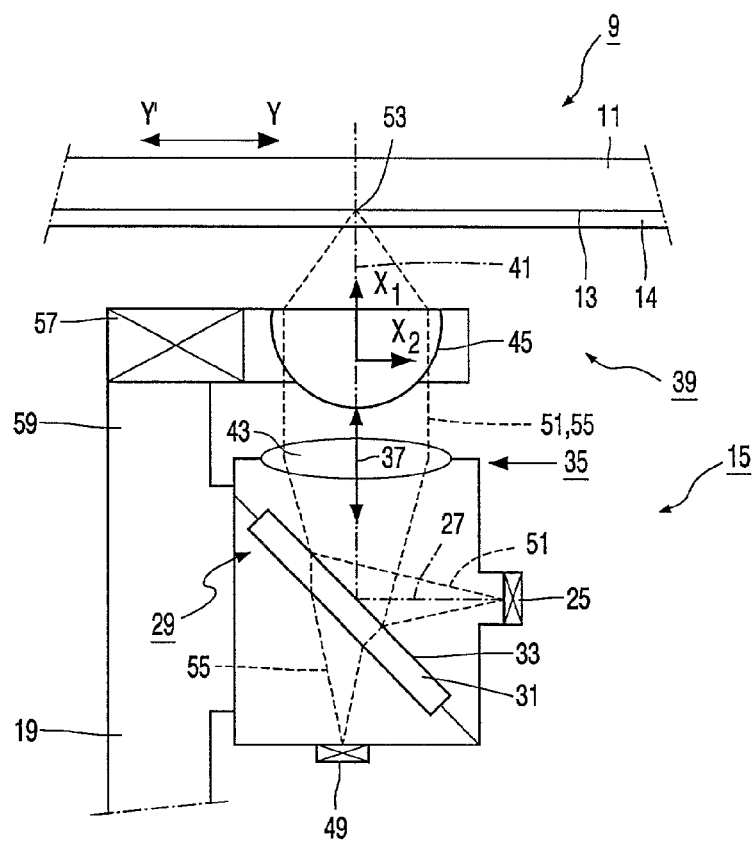
Figure 3:
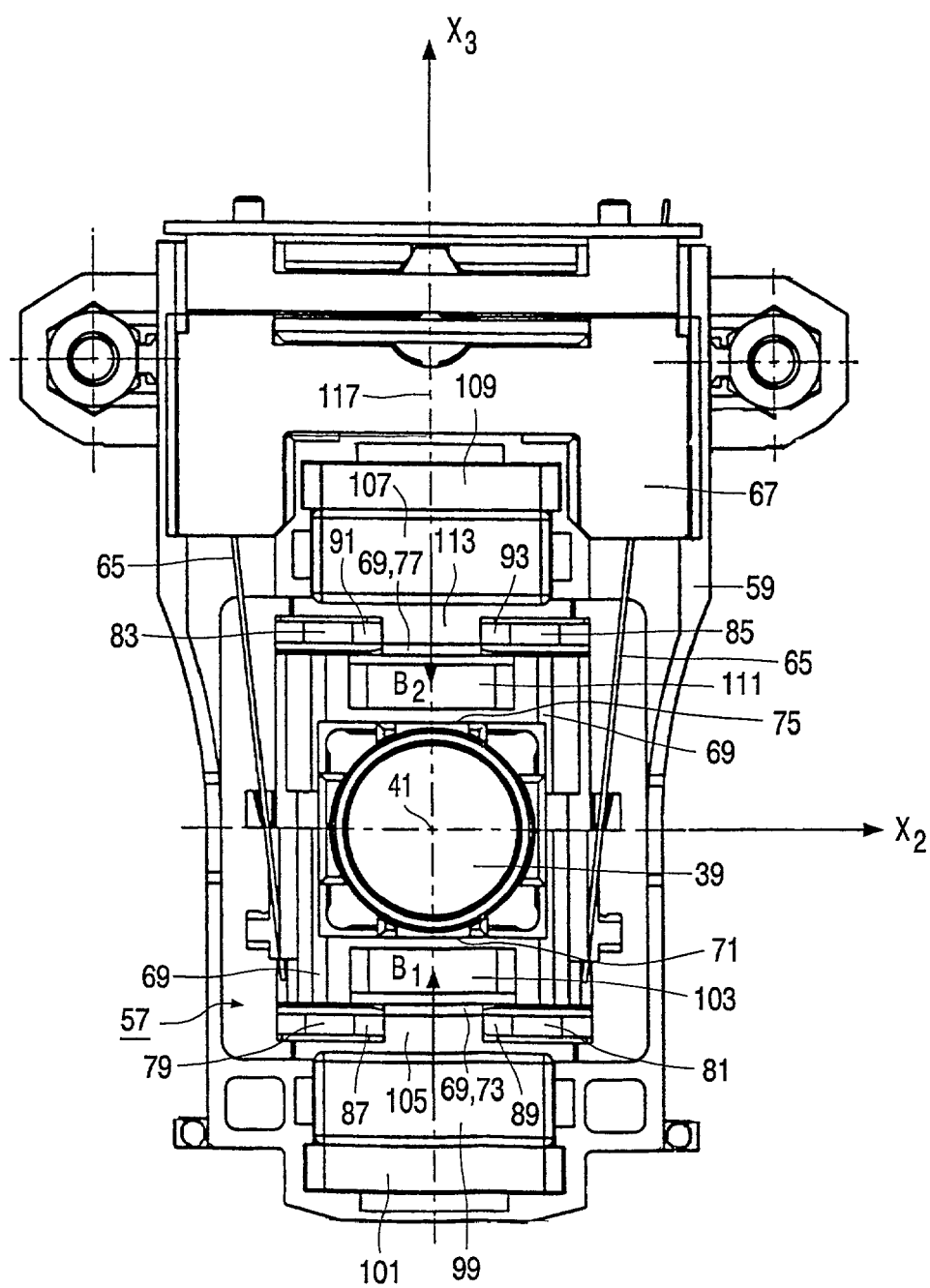

Embodiments of an optical scanning device and an optical player in accordance with the invention are elucidated hereinafter with reference to the drawings, wherein FIG. 1 diagrammatically shows an optical player in accordance with the invention, FIG. 2 diagrammatically shows an optical scanning device in accordance with the invention employed in the optical player in accordance with FIG. 1, FIG. 3 is a plan view of a lens system and an actuator of the scanning device in accordance with FIG. 2.

Figure 4A:
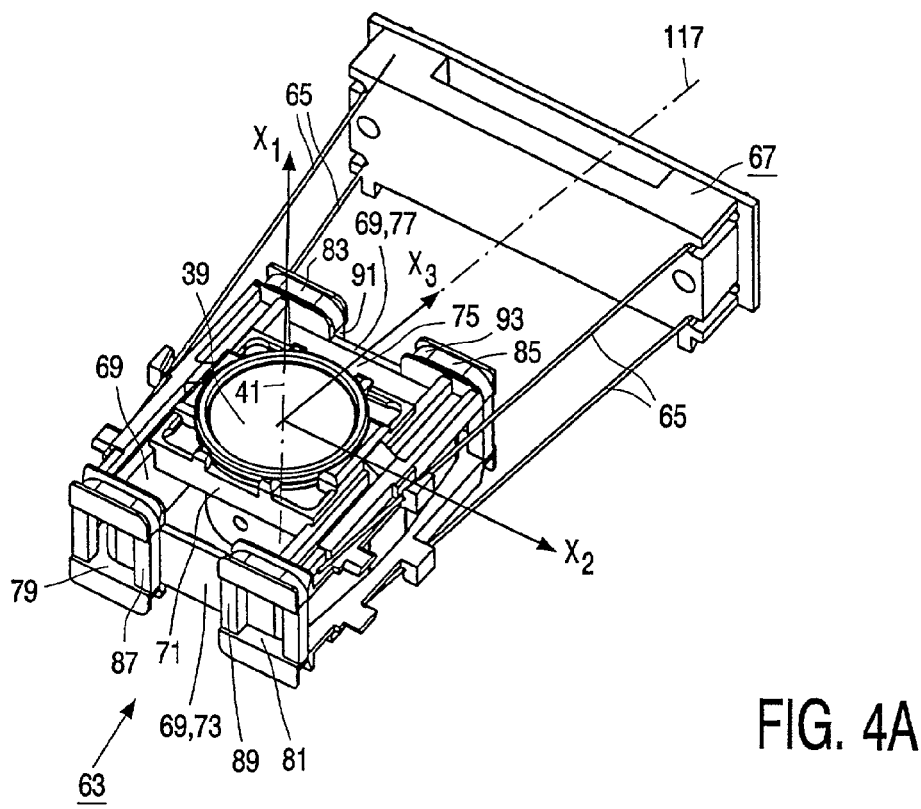
Figure 4B:
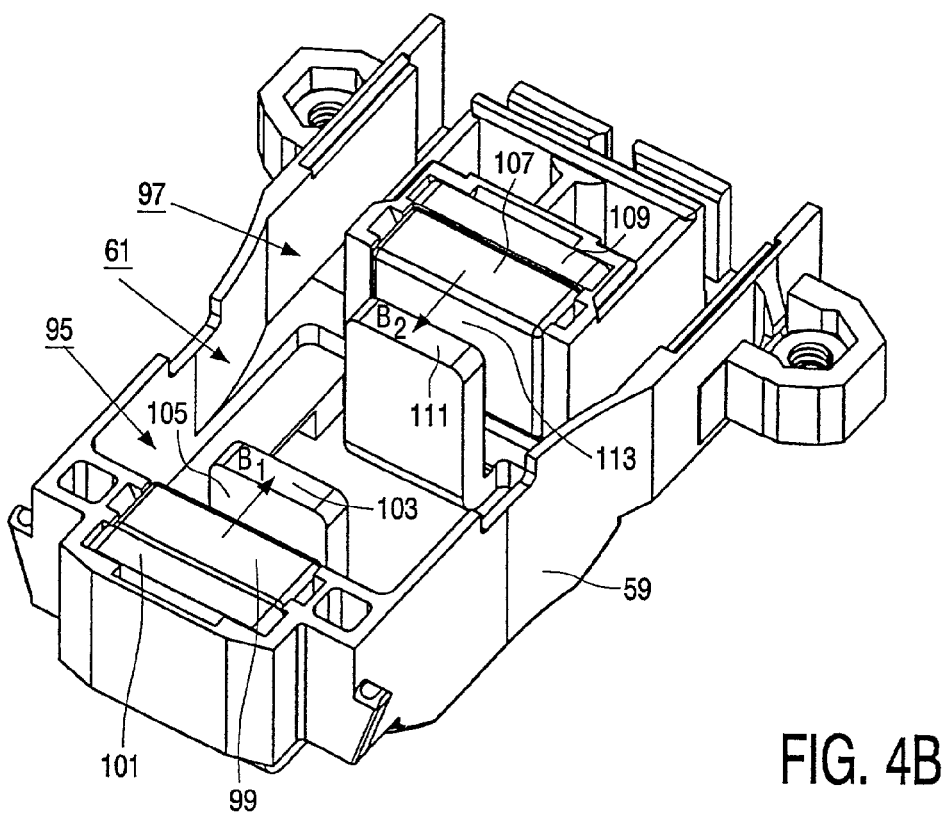
Figure 5:
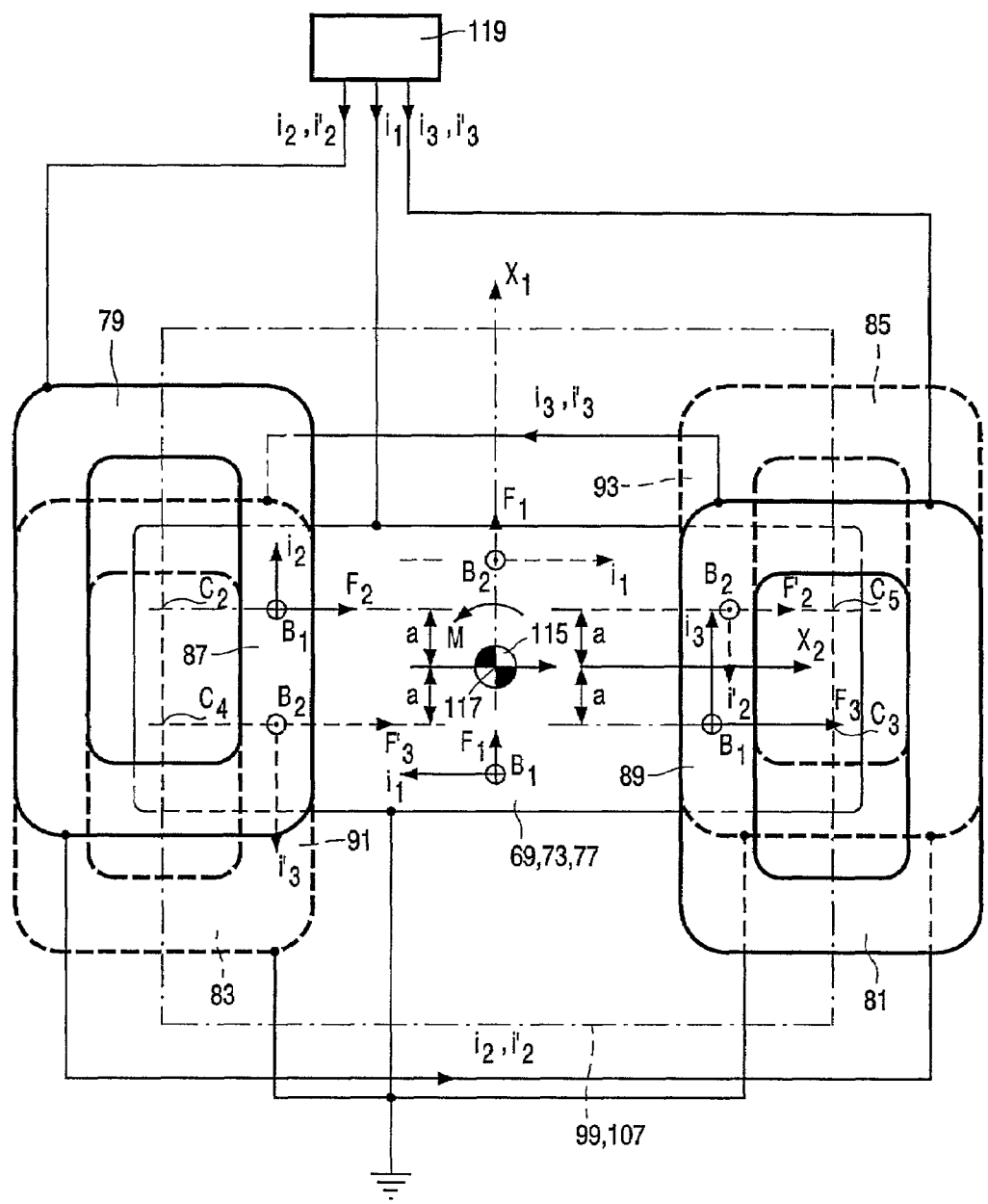

FIG. 4a shows the lens system and an electric coil system of the actuator in accordance with FIG. 3, FIG. 4b shows a magnetic system of the actuator in accordance with FIG. 3, and FIG. 5 is a diagrammatic side view of the coil system in accordance with FIG. 4a.

FIG. 1 diagrammatically shows an optical player in accordance with the invention, which comprises a table 1, which can be rotated about an axis of rotation 3 and driven by means of an electric motor 5, which is secured onto a frame 7. An optically scannable information carrier 9, such as a CD or DVD, can be placed on the table 1, said information carrier 9 being provided with a disc-shaped substrate 11 on which an information layer 13 having a spiral-shaped information track is present. The information layer 13 is covered with a transparent protective layer 14. The optical player further comprises an optical scanning device 15 in accordance with the invention for optically scanning the information track present on the information layer 13 of the information carrier 9. The scanning device 15 can be displaced with respect to the axis of rotation 3 predominantly in two opposite radial directions Y and Y' by means of a displacement device 17 of the optical player. For this purpose, the scanning device 15 is secured to a slide 19 of the displacement device 17, and the displacement device 17 is further provided with a straight guide 21 over which the slide 19 is displaceably guided, which straight guide is provided on the frame 7 and extends parallel to the Y-direction, and the displacement device is further provided with an electric motor 23 by means of which the slide 19 can be displaced over the guide 21. In operation, the control of the motors 5 and 23 by an electric control unit of the optical player, not shown in FIG. 1, and as a result, the rotation of the information carrier 9 about the axis of rotation and, simultaneously, the displacement of the scanning device 15 in a direction parallel to the Y direction are carried out such that the spiral-shaped information track present on the information layer 13 of the information carrier 9 are scanned by the scanning device 15. During scanning, information present on the information track can be read by the scanning device 15 or information can be written on the information track by the scanning device 15.

The optical scanning device 15 in accordance with the invention employed in the optical player in accordance with the invention is diagrammatically shown in FIG. 2. The scanning device 15 is provided with a radiation source 25, such as a semiconductor laser with an optical axis 27. The scanning device 15 further comprises a radiation beam splitter 29 comprising a transparent plate 31 arranged at an angle of 45° with respect to the optical axis 27 of the radiation source 25 and provided with a reflective surface 33 facing the radiation source 25. The scanning device 15 further comprises a collimator lens unit 35 with an optical axis 37 and an optical lens system 39 with an optical axis 41, the collimator lens unit 35 being arranged between the radiation beam splitter 29 and the lens system 39. In the example shown, the collimator lens unit 35 comprises a single collimator lens 43, while the lens system 39 comprises a single objective lens 45. In the example shown, the optical axis 37 of the collimator lens unit 35 and the optical axis 41 of the lens system 39 coincide and include an angle of 90° with the optical axis 27 of the radiation source 25. The scanning device 15 further comprises an optical detector 49, which is of a well-known, commonly used type, and which is arranged, with respect to the collimator lens unit 35, behind the radiation beam splitter 29. In operation, the radiation source 25 generates a radiation beam 51 which is reflected by the reflective surface 33 of the radiation beam splitter 29 and focused by the lens system 39 to a scanning spot 53 on the information layer 13 of the information carrier 9. The radiation beam 51 is reflected by the information layer 13 so as to form a reflected radiation beam 55 which is focused on the optical detector 49 via the lens system 39, the collimator lens unit 35 and the radiation beam splitter 29. To read information present on the information carrier 9, the radiation source 25 generates a continuous radiation beam 51, and the optical detector 49 supplies a detection signal that corresponds to a series of elementary information characteristics on the information track of the information carrier 9, which elementary information characteristics are successively present in the scanning spot 53. To write information on the information carrier 9, the radiation source 25 generates a radiation beam 51 which corresponds to the information to be written, a series of successive, elementary information characteristics being generated in the scanning spot 53 on the information track of the information carrier 9. It is to be noted that the invention also includes optical scanning devices wherein the radiation source 25, the collimator lens unit 35 and the lens system 39 are differently arranged with respect to each other. For example, the invention comprises embodiments wherein the optical axis 37 of the collimator lens unit 35 and the optical axis 41 of the lens system 39 mutually include an angle of 90°, and wherein an additional mirror is arranged between the collimator lens unit 35 and the lens system 39. In these embodiments, the optical scanning device has reduced dimensions, viewed in a direction parallel to the optical axis 41 of the lens system 39. The invention comprises, for example, also embodiments wherein the radiation source 25 and the collimator lens unit 35 are not arranged on the slide 19 but in a fixed position with respect to the frame 7, and wherein the optical axis 37 of the collimator lens unit 35 is directed so as to extend parallel to the radial directions Y, Y'. In these embodiments, only the lens system 39 and an additional mirror are provided on the slide 19, so that the displaceable mass of the slide is reduced.

As is further shown in FIG. 2, the optical scanning device 15 comprises an actuator 57, which will be discussed in greater detail hereinafter, by means of which the lens system 39 can be displaced, with respect to a stationary part 59 of the scanning device 15 secured to the slide 19, over comparatively small distances in a first direction $X_1$ parallel to the optical axis 41, and over comparatively small distances in a second direction $X_2$, which extends perpendicularly to the first direction $X_1$ and parallel to the Y-direction. By displacing the lens system 39 in the first direction $X_1$ by means of the actuator 57, the scanning spot 53 is focused with the desired accuracy on the information layer 13 of the information carrier 9. By displacing the lens system 39 in the second direction $X_2$ by means of the actuator 57, the scanning spot is maintained with the desired accuracy on the information track to be followed. To this end, the actuator 57 is controlled by said control unit of the optical player, which receives both a focusing error signal and a tracking error signal from the optical detector 49.

The assembly of the lens system 39 and the actuator 57 is shown in FIG. 3. FIG. 4b shows a magnetic system 61 of the actuator 57, which is secured to the stationary part 59 of the scanning device 15. FIG. 4a shows an electric coil system 63 of the actuator 57, which is secured to the lens system 39 and forms part of a movable part of the actuator 57. By means of four elastically deformable metal rods 65, the lens system 39 and the coil system 63 are suspended from a fixing member 67 which is secured to the stationary part 59. The coil system 63 includes a first electric coil 69 which is wound around the lens system 39. Near a first side 71 of the lens system 39, the first coil 69 is provided with wire portions 73 extending parallel to the second direction $X_2$, and, near a second side 75 of the lens system 39, the first coil 69 is provided with wire portions 77 which also extend parallel to the second direction $X_2$, the first side 71 and the second side 75, viewed in a direction parallel to a third direction $X_3$ perpendicular to the first direction $X_1$ and perpendicular to the second direction $X_2$, being situated on either side of the lens system 39. The coil system 63 further comprises a second electric coil 79 and a third electric coil 81, a fourth electric coil 83 and a fifth electric coil 85, which are identical to said second electric coil. The second coil 79 and the third coil 81 are situated near the first side 71 of the lens system 39 and are each provided with wire portions 87 and 89 extending parallel to the first direction $X_1$. The fourth coil 83 and the fifth coil 85 are situated near the second side 75 of the lens system 39 and are each provided with wire portions 91 and 93 which also extend parallel to the first direction $X_1$. As shown in FIG. 3 and FIG. 4b, the magnetic system 61 comprises a first part 95, which is arranged near the first side 71 of the lens system 39, and a second part 97, which is arranged near the second side 75 of the lens system 39. The first part 95 of the magnetic system 61 comprises a permanent magnet 99 and a closing yoke of a magnetizable material having a first leg 101, on which the magnet 99 is secured, and a second leg 103 which, viewed in a direction parallel to the third direction $X_3$, is arranged opposite the magnet 99. An air gap 105 accommodating said wire portions 73 of the first coil 69 and said wire portions 87 and 89 of the second coil 79 and the third coil 81, respectively, is situated between the magnet 99 and the second leg 103. The second part 97 of the magnetic system 61 comprises a permanent magnet 107 and a closing yoke of a magnetizable material having a first leg 109, on which the magnet 107 is secured, and a second leg 111, which viewed in a direction parallel to the third direction $X_3$, is arranged opposite the magnet 107. An air gap 113 accommodating said wire portions 77 of the first coil 69 and said wire portions 91 and 93 of the fourth coil 83 and the fifth coil 85, respectively, is situated between the magnet 107 and the second leg 111. The magnets 99 and 107 are magnetized, respectively, parallel to the third direction $X_3$ and contrary to the third direction $X_3$, so that, respectively, a magnetic field $B_1$ extending substantially parallel to the third direction $X_3$ and a magnetic field $B_2$ extending substantially in opposition to the third direction $X_3$ are present in the air gaps 105 and 113.

In FIG. 5, the positions of the second coil 79, the third coil 81, the fourth coil 83 and the fifth coil 85 with respect to each other are more accurately depicted in a diagrammatic view of the coil system 63 taken near the first side 71 of the lens system 39. FIG. 5 also shows a center of gravity 115 of a mass formed by the lens system 39 and the displaceable part of the actuator 57, which center of gravity is situated substantially on the optical axis 41 of the lens system 39. FIG. 5 further shows the circumference of the magnets 99 and 107, which corresponds substantially to a circumference of the magnetic fields $B_1$ and $B_2$ in the air gaps 105 and 113. As shown in FIG. 5, the wire portions 87 and 89 of the second coil 79 and the third coil 81, respectively, which extend parallel to the first direction $X_1$, are entirely situated in the magnetic field $B_1$, while the other wire portions of the second coil 79 and the third coil 81, which extend parallel to the first direction $X_1$, are situated outside the magnetic field $B_1$. Also the wire portions 91 and 93 of the fourth coil 83 and the fifth coil 85, which extend parallel to the first direction $X_1$, are situated entirely in the magnetic field $B_2$, while the other wire portions of the fourth coil 83 and the fifth coil 85, which extend parallel to the first direction $X_1$, are situated outside the magnetic field $B_2$. Furthermore, the wire portions 73 and 77 of the first coil 69, which extend parallel to the second direction $X_2$, are entirely situated in, respectively, the magnetic field $B_1$ and the magnetic field $B_2$. By interaction of the magnetic fields $B_1$, $B_2$ with an electric current $i_1$ in the first coil 69, the wire portions 73 and 77 of the first coil are subjected to substantially equal Lorentz forces $F_1$, which extend parallel to the first direction $X_1$, under the influence of which the lens system 39 is displaced in a direction parallel to the optical axis 41, thereby elastically deforming the rods 65. It is to be noted that the points of application of the Lorentz forces $F_1$, viewed in a direction parallel to the first direction $X_1$ and parallel to the second direction $X_2$, are situated substantially in the center of gravity 115. In FIG. 5, said points of application are shown in mutually displaced positions for drawing-technical reasons.

The wire portions 87, 89, 91 and 93 of the second coil 79, the third coil 81, the fourth coil 83 and the fifth coil 85 are subjected to Lorentz forces in the following manner. As shown in FIG. 5, a center $C_2$ of the second coil 79, viewed in a direction parallel to the first direction $X_1$, is situated at a distance a above the center of gravity 115, while a center $C_3$ of the third coil 81, viewed in a direction parallel to the first direction $X_1$, is situated at an equal distance a below the center of gravity 115. Similarly, a center $C_4$ of the fourth coil 83, viewed in a direction parallel to the first direction $X_1$, is situated at an equal distance a below the center of gravity 115, while a center $C_5$ of the fifth coil 85, viewed in a direction parallel to the first direction $X_1$, is situated at an equal distance a above the center of gravity 115. The second coil 79 and the fifth coil 85, which are both situated above the center of gravity 115, are mutually arranged in series in such a manner that equally large currents $i_2$ and $i'_2$ flow in opposite directions through the wire portions 87 and 93. The third coil 81 and the fourth coil 83, which are both situated below the center of gravity 115, are mutually arranged in series such that equally large currents $i_3$ and $i'_3$ flow in opposite directions through the wire portions 89 and 91. By interaction between the magnetic fields $B_1$ and $B_2$ and the currents $i_2$ and $i'_2$, respectively, substantially equal Lorentz forces $F_2$ and $F'_2$ extending parallel to the second direction $X_2$ are exerted on the wire portions 87 and 93, while, by interaction between the magnetic fields $B_1$ and $B_2$ and the currents $i_3$ and $i'_3$, respectively, substantially equal Lorentz forces $F_3$ and $F'_3$ extending parallel to the second direction $X_2$ are exerted on the wire portions 89 and 91. As said centers $C_2$, $C_5$ and said centers $C_3$, $C_4$, viewed in a direction parallel to the first direction $X_1$, are situated on either side of and substantially equidistantly from the center of gravity 115, and the wire portions 87, 89, 91 and 93 are entirely situated in the magnetic fields $B_1$ and $B_2$, respectively, the points of application of the Lorentz forces $F_2$, $F'_2$ and the points of application of the Lorentz forces $F_3$, $F'_3$, viewed in a direction parallel to the first direction $X_1$, are also situated on either side of and substantially equidistantly from the center of gravity 115. As a result, if the currents $i_2$ and $i'_2$ are not equal to the currents $i_3$ and $i'_3$, the Lorentz forces $F_2$, $F'_2$, $F_3$ and $F'_3$ do not only lead to a force extending substantially parallel to the third direction $X_3$, under the influence of which the lens system 39 is displaced in a direction parallel to the Y-direction, thereby elastically deforming the rods 65, but the Lorentz forces $F_2$, $F'_2$, $F_3$ and $F'_3$ also lead to a mechanical torque M about a tilt axis 117 directed parallel to the third direction $X_3$, under the influence of which torque the lens system 39 is tilted about this tilt axis 117, thereby elastically deforming the rods 65. If the currents $i_2$, $i'_2$, $i_3$ and $i'_3$ are equal, then also the Lorentz forces $F_2$, $F'_2$, $F_3$ and $F'_3$ are substantially equal, so that the Lorentz forces $F_2$, $F'_2$, $F_3$ and $F'_3$ do not lead to a mechanical torque about the tilt axis 117, and substantially exclusively lead to a displacement of the lens system 39 in a direction parallel to the Y direction.

In the scanning device 15 in accordance with the invention, the above-mentioned possibility of tilting the lens system 39 about the tilt axis 117 is used to direct, in operation, the radiation beam 51 perpendicularly to the information layer 13 of the information carrier 9 in the best possible way. Particularly in the case of information carriers with a comparatively high information density, such as a DVD, this is a prerequisite for faultless scanning the information track present on the information layer 13. Without said possibility of tilting, the angle between the radiation beam 51 and the information layer 13 would vary too much, in operation, as a result of an oblique position or warpage of the information carrier 9. In practice it has been found that the possibility of tilting the lens system 39 exclusively about a tilt axis extending perpendicularly to the radial Y direction, as in the case of the scanning device 15 in accordance with the invention, is generally sufficient to adequately compensate for an oblique position or warpage of the information carrier 9. In the scanning device 15 in accordance with the invention, said control unit of the scanning device 15, indicated by means of reference numeral 119 in FIG. 5, receives a measuring signal in a manner which is known per se, from the reflected radiation beam 55 by means of the optical detector 49, but to measure said orientation, the scanning device 15 can alternatively be provided with a separate optical sensor or other type of sensor. The control unit 119 determines, on the basis of said measuring signal, a necessary angle through which the lens system 39 must be tilted about the tilt axis 117, and a value and a direction of the currents $i_2$, $i'_2$ and $i_3$, $i'_3$ by means of which said angle can be adjusted. As the distance from the centers $C_2$ and $C_5$ to the center of gravity 115, and the distance from the centers $C_3$ and $C_4$ to the center of gravity 115, viewed in a direction parallel to the first direction $X_1$, are equally large, the lens system 39 is displaced exclusively in the second direction $X_2$ if the currents $i_2$ and $i_3$ are equally large and flow in the same direction, and the lens system 39 is only tilted about the tilt axis 117 if the currents $i_2$ and $i_3$ are equally large yet of opposite sense. The currents $i_2$, $i'_2$, $i_3$ and $i'_3$, which are necessary to simultaneously obtain a desired displacement of the lens system 39 in the second direction $X_2$ and a desired tilt of the lens system 39 about the tilt axis 117, can be determined in a comparatively simple manner by adding up the currents necessary for a single displacement and a single tilt. As a result, the construction of the control unit 119 is comparatively simple. As the second coil 79 and the fifth coil 85 are arranged in series, and also the third coil 81 and the fourth coil 83 are arranged in series, the necessary current supply to the coil system 63 of the actuator 57 can take place via the four metal rods 65, three of the four rods 65 serving to supply, respectively, the currents $i_1$, $i_2$ ($i'_2$) and $i_3$ ($i'_3$), and the fourth rod 65 serving as a common earth connection of all coils 69, 79, 81, 83, 85 of the coil system 63.

The second coil 79, the third coil 81, the fourth coil 83 and the fifth coil 85, viewed in a direction parallel to the third direction $X_3$, are also situated at substantially equal distances from the center of gravity 115. As, in addition, the sum of the Lorentz forces $F_2$ and $F_3$ exerted on the second coil 79 and the third coil 81 is equally large as and acts in the same direction as the sum of the Lorentz forces $F'_3$ and $F'_2$ exerted on the fourth coil 83 and the fifth coil 85, the Lorentz forces $F_2$, $F'_2$, $F_3$ and $F'_3$ do not lead to an undesirable mechanical torque about the optical axis 39, under the influence of which undesirable rotations of the lens system 39 about the optical axis 41 could take place. It is to be noted that a sufficient degree of tiltability of the lens system can also be achieved in embodiments of a scanning device in accordance with the invention wherein the coil system of the actuator comprises only two coils which, viewed in a direction parallel to the first direction $X_1$, are situated in different positions with respect to each other to generate a force in the second direction $X_2$ and a mechanical torque about a tilt axis directed parallel to the third direction $X_3$. In such an embodiment, an undesirable mechanical torque of the Lorentz forces about the optical axis of the lens system develops. However, said torque can be limited as much as possible by arranging both coils, viewed in a direction parallel to the third direction $X_3$, on either side of, and at equal distances from the center of gravity of the displaceable mass. The coil system of the actuator of a scanning device in accordance with the invention thus comprises a comparatively small number of coils, as a result of which the construction of the scanning device in accordance with the invention is comparatively simple.

It is further to be noted that the invention also includes embodiments wherein the two coils of the two coil pairs, viewed in a direction parallel to the first direction $X_1$, are arranged at unequal distances from the center of gravity of the displaceable mass. The invention thus comprises, in a general sense, embodiments wherein the two coils or the two coil pairs, viewed in a direction parallel to the first direction $X_1$, are situated in different positions with respect to each other. Preferably, the two coils or the two coil pairs are situated, viewed in a direction parallel to the first direction $X_1$, on either side of said center of gravity, so that, apart from a mechanical torque about the tilt axis extending parallel to the third direction $X_3$, also a comparatively large force can be generated in the second direction $X_2$.

In the above-described embodiments of a scanning device in accordance with the invention, the wire portions of the coils extending parallel to the first direction $X_1$ are entirely situated in the magnetic field of the magnetic system, said wire portions being used to generate the force in the second direction $X_2$ and the mechanical torque about the tilt axis extending parallel to the third direction $X_3$. By virtue thereof, said wire portions are used completely to generate said force and said torque, so that the actuator of the scanning device has a high efficiency. It is to be noted that the invention also includes embodiments wherein said wire portions are not entirely situated in said magnetic field. In order to be able to generate, in such embodiments, a mechanical torque about said tilt axis, the points of application of the Lorentz forces on the two coils or on the two coil pairs must be situated, viewed in a direction parallel to the first direction $X_1$, in different positions with respect to each other. This is achieved, for example, with two coils or two coil pairs which, viewed in a direction parallel to the first direction $X_1$, are situated in equal positions and two magnets which, viewed in a direction parallel to the first direction $X_1$, are situated in different positions with respect to each other. For this reason, the invention includes, in a general sense, embodiments wherein the points of application of the forces, extending parallel to the second direction $X_2$, on said wire portions of the two coils or coil pairs are situated, in operation, viewed in a direction parallel to the first direction $X_1$, in different positions with respect to each other.

By means of the above-described optical player and the optical scanning device in accordance with the invention employed therein, information present on the information layer 13 can be read or information can be written on the information layer 13 during scanning the information layer 13 of the information carrier 9. Finally, it is to be noted that the invention also includes optical players and optical scanning devices by means of which only information present on an information layer of an information carrier can be read or which can only be used to write information on an information layer of an information carrier.

What is claimed is:

1. An optical scanning device for scanning an information layer of an optically scannable information carrier, said scanning device comprising:
    a radiation source,
    an optical lens system with an optical axis for focusing a radiation beam supplied, in operation, by the radiation source to a scanning spot on the information layer, and
    an actuator comprising an electric coil system and a magnetic system for displacing the lens system with respect to a stationary part of the scanning device, in a first direction parallel to the optical axis and in a second direction perpendicular to the first direction,
    the electric coil system comprising a first electric coil and a second electric coil including wire portions directed parallel to the first direction,
    wherein a point of application of a first force on said wire portions of the first coil, and a point of application of a second force on said wire portions of the second coil are situated in different positions with respect to each other, viewed in a direction parallel to the first direction, said first force and said second force being parallel to the second direction,
    wherein the electric coil system includes two coil pairs which, viewed in a direction parallel to a third direction directed perpendicularly to the first direction and perpendicularly to the second direction, are situated on either side of and substantially equidistantly from a center of gravity of a mass formed by the optical lens system and a movable part of the actuator, and
    wherein centers of the first coil and the second coil of each coil pair, viewed in a direction parallel to the first direction, are situated on either side of and substantially equidistantly from the center of gravity.

2. The optical scanning device as claimed in claim 1, wherein said point of application on the first coil, and said point of application on the second coil are situated, viewed in the direction parallel to the first direction, on either side of and substantially equidistantly from the center of gravity.

3. The optical scanning device as claimed in claim 1, wherein said wire portions of the first coil and the second coil are entirely situated, in operation, in a magnetic field of the magnetic system, a center of the first coil and a center of the second coil being situated, viewed in the direction parallel to the first direction, in different positions with respect to each other.

4. An optical player comprising the optical scanning device as claimed in claim 1.

5. An optical scanning device provided with a radiation source, an optical lens system with an optical axis for focusing a radiation beam to form a scanning spot on an information layer, and an actuator having an electric coil system and a magnetic system for displacing the lens system with respect to a stationary part of the scanning device, in a first direction parallel to the optical axis and in a second direction perpendicular to the first direction, the coil system having two coil pairs, each of said two coil pairs having a first coil and a second coil including wire portions directed parallel to the first direction, comprising:

a first point of application of a first force on said wire portions of the first coil, wherein the first force is directed parallel to the second direction;

a second point of application of a second force on said wire portions of the second coil, wherein the second force is directed parallel to the second direction; and wherein the first force and the second force are situated, viewed in a direction parallel to the first direction, in different positions with respect to each other, wherein the two coil pairs, viewed in a direction parallel to a third direction directed perpendicularly to the first direction and perpendicularly to the second direction, are situated on either side of and substantially equidistantly from a center of gravity of a mass formed by the lens system and a movable part of the actuator, and wherein centers of the first coil and the second coil of each coil pair, viewed in a direction parallel to the first direction, are situated on either side of and substantially equidistantly from the center of gravity.

6. An optical scanning device as claimed in claim 5, wherein said wire portions of the first and the second coils are entirely situated, during operation, within a magnetic field of the magnetic system, a center of the first coil and a center of the second coil being situated, viewed in a direction parallel to the first direction, in different positions with respect to each other.

7. The optical scanning device as claimed in claim 5, wherein said point of application on the first coil, and said point of application on the second coil are situated, viewed in the direction parallel to the first direction, are substantially equidistantly from the center of gravity.

* * * * *